US010536094B2

(12) United States Patent
Zmood et al.

(10) Patent No.: US 10,536,094 B2
(45) Date of Patent: Jan. 14, 2020

(54) EFFICIENT SWITCHING FOR CONVERTER CIRCUIT

(71) Applicant: Solaredge Technologies, Ltd., Herzeliya (IL)

(72) Inventors: Daniel Zmood, Ness Ziona (IL); Tzachi Glovinsky, Petah Tikva (IL); Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 16/190,316

(22) Filed: Nov. 14, 2018

(65) Prior Publication Data

US 2019/0157987 A1 May 23, 2019

Related U.S. Application Data

(60) Provisional application No. 62/588,474, filed on Nov. 20, 2017.

(51) Int. Cl.
*H02M 7/537* (2006.01)
*H02M 7/487* (2007.01)
(Continued)

(52) U.S. Cl.
CPC ............ *H02M 7/537* (2013.01); *H02M 1/08* (2013.01); *H02M 7/487* (2013.01); *H02M 2001/0054* (2013.01)

(58) Field of Classification Search
CPC ........ H02M 7/487; H02M 1/08; H02M 7/537; H02M 2001/0048; H02M 7/42; H02M 2001/0009
(Continued)

(56) References Cited

U.S. PATENT DOCUMENTS 6,930,899 B2 * 8/2005 Bakran ................. H02M 7/487
363/132
8,730,696 B2 * 5/2014 Barbosa ............... H02M 7/483
363/71
(Continued)

FOREIGN PATENT DOCUMENTS

EP    2413489 A1    2/2012
EP    2871765 A1    5/2015
(Continued)

OTHER PUBLICATIONS

Wang Yong et al. "Diode-Free T-Type Three-Level Neutral-Point-Clamped Inverter for Low-Voltage Renewable Energy System" —Nov. 1, 2014.
(Continued)

*Primary Examiner* — Rajnikant B Patel
(74) *Attorney, Agent, or Firm* — Banner & Witcoff, Ltd.

(57) ABSTRACT

An apparatus includes a first switch leg connected between a first input terminal and a first output terminal, the first switch leg comprising serially connected switches. The apparatus also includes a second switch leg connected between a second input terminal and the first output terminal, the second switch leg comprising serially connected switches. The apparatus further includes a third switch leg connected between an input voltage midpoint and the first output terminal. A controller controls the first switch leg, the second switch leg and the third switch leg, wherein the controller is configured to disable the second switch leg for a first time period and alternately enable the first switch leg and the third switch leg during the first time period, and to disable the first switch leg for a second time period and to alternately enable the second leg and the third leg during the second time period.

20 Claims, 9 Drawing Sheets

(51) Int. Cl.
*H02M 1/08* (2006.01)
*H02M 1/00* (2006.01)

(58) Field of Classification Search
USPC .............. 363/43, 66, 71, 77, 132, 137, 50
See application file for complete search history.

(56) References Cited

U.S. PATENT DOCUMENTS

| | | | |
|---|---|---|---|
| 8,848,405 B2 * | 9/2014 | Temesi ................. | H02M 7/483 363/131 |
| 9,413,268 B2 * | 8/2016 | Fu ......................... | H02M 7/487 |
| 9,800,176 B2 * | 10/2017 | Ding ................. | H03K 17/0828 |
| 10,177,683 B2 * | 1/2019 | Shi ........................ | H02M 7/483 |
| 2011/0193412 A1 | 8/2011 | Lacarnoy | |
| 2013/0301314 A1 * | 11/2013 | Fu ......................... | H02M 7/487 363/37 |
| 2014/0132068 A1 * | 5/2014 | Zabaleta Maeztu .. | H02M 7/483 307/26 |
| 2017/0187297 A1 * | 6/2017 | Narita ................ | H02M 3/3376 |
| 2017/0302153 A1 | 10/2017 | Mochiki et al. | |

FOREIGN PATENT DOCUMENTS

| | | |
|---|---|---|
| EP | 2953258 A2 | 12/2015 |
| WO | 2014082221 A1 | 6/2014 |

OTHER PUBLICATIONS

Apr. 11, 2019 European Search Report for EP App. No. 18206400.6.

* cited by examiner

EFFICIENT SWITCHING FOR CONVERTER CIRCUIT

RELATED APPLICATIONS

This application claims priority to U.S. provisional application Ser. No. 62/588,474, filed Nov. 20, 2017, entitled "Efficient Switching Circuit," the entire contents of which are incorporated herein by reference.

BACKGROUND

Power converters may be used for converting direct current (DC) voltage to a different DC voltage or an alternating current (AC) voltage. Converter construction may typically make use of power transistors and diodes. The power transistors and diodes may be operated as electronic switches. Certain converter designs may use "hard" switching, which may give rise to switching losses which, for high values of the switching frequency, may cause a reduction in energy conversion efficiency. Hard switching may be characterized by a total commutation voltage drop over the current-carrying switch at a current commutation time. In case of hard switching, the voltage may increase up to the value of the commutation voltage while the current continues flowing, before the voltage drops, that may cause high power loss peaks in the switch. It may therefore be desirable to develop converter topologies and switching methods that enable "soft" switching, which may reduce total switching losses.

In attempts to improve converter efficiency and reduce costs, high-power converters may make use of a technique referred to as multi-level conversion. Multi-level converter design may reduce the occurrence of simultaneously high values of voltage and current, and hence high-power dissipation values, during the switching process. Additionally, multi-level converter topologies may provide multiple output voltage values, which may reduce the size of associated output filters. It may be desirable to develop converter topologies and efficient switching methodologies to improve the cost and/or efficiency of inverters.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Aspects disclosed herein may include an AC/DC converter (also known as an inverter) circuit and a method for converting direct current (DC) power at the inverter circuit input to an alternating current (AC) power at the inverter circuit output. According to at least one aspect, the inverter circuit may include circuitry that may be configured to reduce switching and/or conduction losses of switches utilized in the inverter circuit to convert DC power to AC power, and the inverter circuit may provide auxiliary switches to reduce switching losses and to potentially increase efficiency of the inverter circuit.

According to at least one aspect, a plurality of switches (e.g., metal oxide semiconductor field effect transistors (MOSFETs)) may be connected in series to form a switching leg having an effective voltage blocking capacity equal to about several times the voltage blocking capacity of a single switch. The plurality of switches may be configured to dynamically block a first voltage during a first time portion of a switching period, and to statically block a second voltage during a second time portion of a switching period. For example, three MOSFETs, each having a voltage rating (indicative of a voltage blocking capacity) of Vo volts, for example, 200V, may be connected in series to form an effective switching leg having a voltage rating of about 600V. To reduce switching loss and/or to reduce a need for highly-synchronized switching, one or more switches of a switching leg may be held in the ON state during a portion of a switching cycle when the voltage applied across the switching leg may be blocked by a reduced number of switches.

For example, a switching leg of a converter may feature two 600V-rated insulated gate bipolar transistors (IGBT). During a switching cycle, for a first portion of the switching cycle, the switching leg may alternate between conducting (where both IGBTs are ON), and dynamically blocking 600V (where one of the IGBTs is kept ON, and one is turned OFF to block up to 600V). For a second portion of the switching cycle, both IGBTs may be OFF, statically blocking voltages up to 1200V.

As another example, a switching leg may feature three 200V-rated MOSFET switches. During a switching cycle, the switching leg may alternate between the ON state (i.e., all three switches are ON) and the OFF state (where one or more of the three MOSFETs are OFF). If, for a first portion of a switching cycle, when in the OFF state the switching leg blocks no more than 200V, a single switch may be switched between the ON and OFF states, and two switches may be kept in the ON state throughout the first portion of the switching cycle. When the single switch is OFF, the switching leg dynamically blocks a voltage of up to 200V, and when the single switch is ON (along with the two switches kept in the ON state), the switching leg is conducting. If, for a second portion of the switching cycle, when in the OFF state the switching leg dynamically blocks no more than 400V, two switches may be switched together between the ON and OFF states, and a single switch may be kept in the ON state throughout the switching period. When the two switches are ON (along with the single switch kept ON) the switching leg is conducting, and when the two switches are OFF, the switching leg dynamically blocks a voltage up to 400V. For a third portion of the switching period, when the switching leg is required to block over 400V, all three switches may be kept in the OFF state, statically blocking up to 600V.

According to at least one aspect, a switching leg may have one or more switches switched at a low frequency (e.g., a grid frequency such as 50 Hz or 60 Hz) and one or more switches switched at a high frequency (e.g., 10 kHz, 100 kHz, 1 MHz or higher). By way of example and not by way of limitation, the high frequency is at least an order of magnitude greater than the low frequency.

According to at least one aspect, a switching leg may include a leg of one or more main switches, connected in parallel with a leg including one or more auxiliary switches connected in series. The main switches may have improved conduction characteristics compared to the auxiliary switches. When switching a switching leg, one or more of the auxiliary switches may be turned ON at a short time delay before a corresponding main switch, and the one or more of the auxiliary switches may be turned OFF at a short time delay after the corresponding main switch, to provide soft-switching operating conditions for the main switch.

According to at least one aspect, the auxiliary switches may replace the main switches, and a switching leg may include a single leg of serially connected switches.

According to at least one aspect, there is provided a switching circuit for a converter. The switching circuit includes a plurality of switches connected in series to form a switching leg. The switching circuit also includes a controller configured to cause the switching leg to alternate between: a) an ON state in which at least one of the plurality of switches comprising the switching leg is maintained in an ON state and at least one of the plurality of switches comprising the switching leg is switched between an ON state and an OFF state during a first portion of each switching cycle of the switching circuit, and b) an OFF state in which each of the plurality of switches comprising the switching leg is maintained in an OFF state during a second portion of each switching cycle of the switching circuit.

According to the at least one aspect described above, the switching leg comprises first and second switches each having a voltage rating of Vo volts such that the switching leg has a voltage rating of 2*Vo volts, wherein controller controls the switching leg such that the first switch is switched between an ON state and an OFF state and the second switch is maintained in the ON state during a first portion of each switching cycle, and wherein the switching leg blocks no more than Vo volts during the first portion of each switching cycle, so as to result in dynamic blocking of up to a Vo voltage level during the first portion of each switching cycle.

According to the at least one aspect described above, the controller controls the switching leg such that the first and second switches are switched to be in an OFF state during a second portion of each switching cycle, so as to result in statically blocking of up to a 2*Vo voltage level during the second portion of each switching cycle.

According to the at least one aspect described above, the controller controls the switching leg such that the first and second switches are switched to be in an OFF state during a second portion of each switching cycle, so as to result in statically blocking of up to a 2*Vo voltage level during the second portion of each switching cycle.

According to the at least one aspect described above, the switching leg comprises first, second and third switches each having a voltage rating of Vo volts such that the switching leg has a voltage rating of 3*Vo volts, wherein the first and second switches are each switched between an ON state and an OFF state and the third switches is maintained in the ON state during a first portion of each switching cycle, and wherein the switching leg blocks no more than 2*Vo volts during the first portion of each switching cycle, so as to result in statically blocking of up to a 2*Vo voltage level during the second portion of each switching cycle.

According to the at least one aspect described above, the controller controls the switching leg such that the first, second and third switches are switched to be in an OFF state during a second portion of each switching cycle, so as to result in statically blocking of up to a 3*Vo voltage level during the second portion of each switching cycle.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings.

The present disclosure is illustrated by way of example, and not limited by, the accompanying figures.

DETAILED DESCRIPTION

In the following description of various illustrative aspects, reference is made to the accompanying drawings, which form a part hereof, and in which is shown, by way of illustration, various aspects in which aspects of the disclosure may be practiced. It is to be understood that other aspects may be utilized and structural and functional modifications may be made, without departing from the scope of the present disclosure.

Features of the present invention may be applied to power conversion from DC voltage to a different DC voltage or to AC voltage. Features may include reducing switching loss by controlling converter switches to combine dynamic (during a 'PWM' mode of operation) and static (during an 'OFF' mode of operation) voltage blocking, and/or the use of auxiliary switches that may have effective switching transient characteristics connected in parallel to main switches. The auxiliary switches connected in parallel to the main switches may help to move the switching losses away from main switches to the higher side of the auxiliary switches, while a substantial majority of current may still flow through main switches.

The term 'ON' as used herein with respect to the operation of switches described below, refers to the active use of a switch during the time period such that during the time period, the switch remains substantially closed circuit (i.e., conducting) for the time period. The term 'OFF' as used herein is with respect to the operation of switches described below and refers to active use of a switch during the time period such that during the time period, the switch remains substantially open circuit (i.e., non-conducting, and statically blocking voltage) for the time period. The term "PWM" as used herein is with respect to the operation of switches described below. As such, unless otherwise stated, the term "PWM" refers to an active use of a switch for a period of time such that the switch is alternately switched from ON to OFF and vice-versa at a high frequency. The active use of the switch during the period of time may include the switch being substantially open circuit (and dynamically blocking voltage) and closed circuit (and conducting) repeatedly during the time period, at a high frequency.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

Figure 1A:
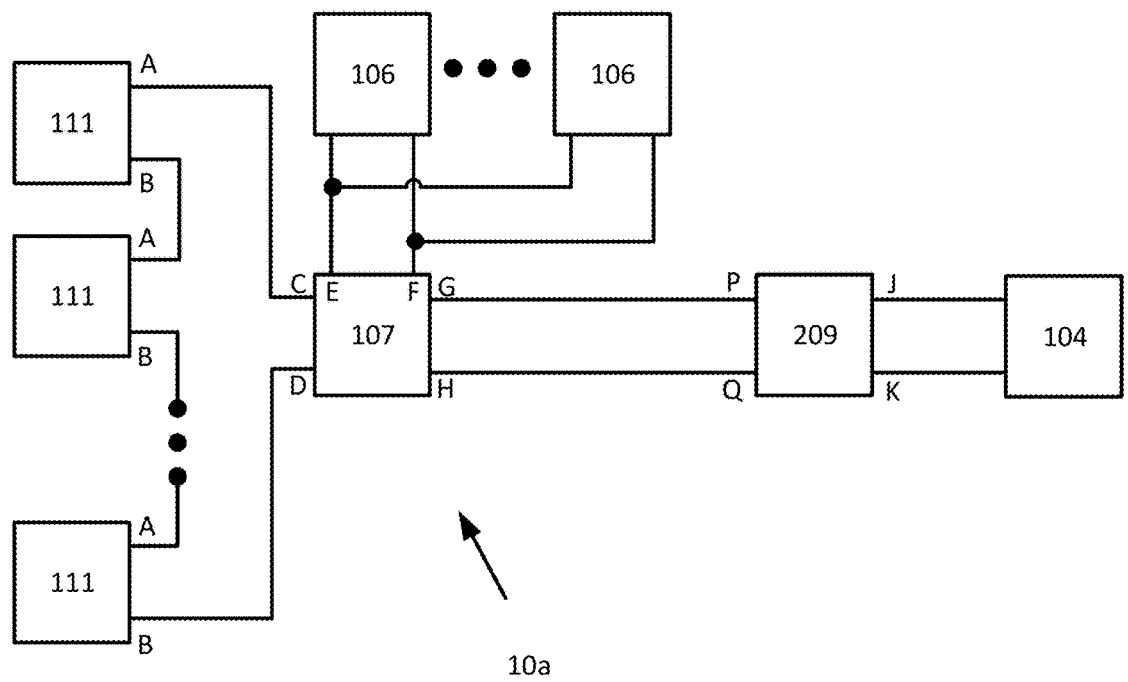
FIGS. 1A and 1B illustrate block diagrams of power systems, according to at least one aspect.

Reference is now made to FIG. 1A, which illustrates a block diagram of a power system 10a, according to at least one aspect. Power system 10a includes multiple wiring configurations 111. Each wiring configuration 111 may include one or more power sources (not shown) that may be connected to a respective power device (also not shown). Power sources may be AC power sources (e.g., wind turbines) or sources of DC power derived from wind turbines, battery banks, photovoltaic solar panels, rectified alternating current (AC) or gasoline-powered generators, for example. Each wiring configuration 111 may include output terminals A and B. The outputs on terminals A and B of the wiring configurations 111 may be connected in series to form a series connection of wiring configuration 111 outputs that may be connected to input terminals C and D of a link unit 107. Connected to terminals E and F of link unit 107 are multiple storage devices 106. Storage devices 106 may be batteries, flywheels and/or super capacitors, for example. A feature of terminals E and F of link unit 107 may be that link unit 107 may be configurable in order to allow storage devices 106 to be charged from wiring configurations 111 and/or system power device 209 and/or discharged into load 104 via system power device 209. Input terminals P and Q of system power device 209 may be connected to terminals G and H of link unit 107. The output terminals J and K of system power device 209 may be connected to load 104 and/or multiple loads 104. System power device 209 according to one or more aspects may be a DC to AC inverter and load 104 may be an AC utility grid, for example. As another example, system power device 209 may be DC combiner boxes, and load 104 may be a DC to AC inverter connected to an AC utility grid.

Figure 1B:
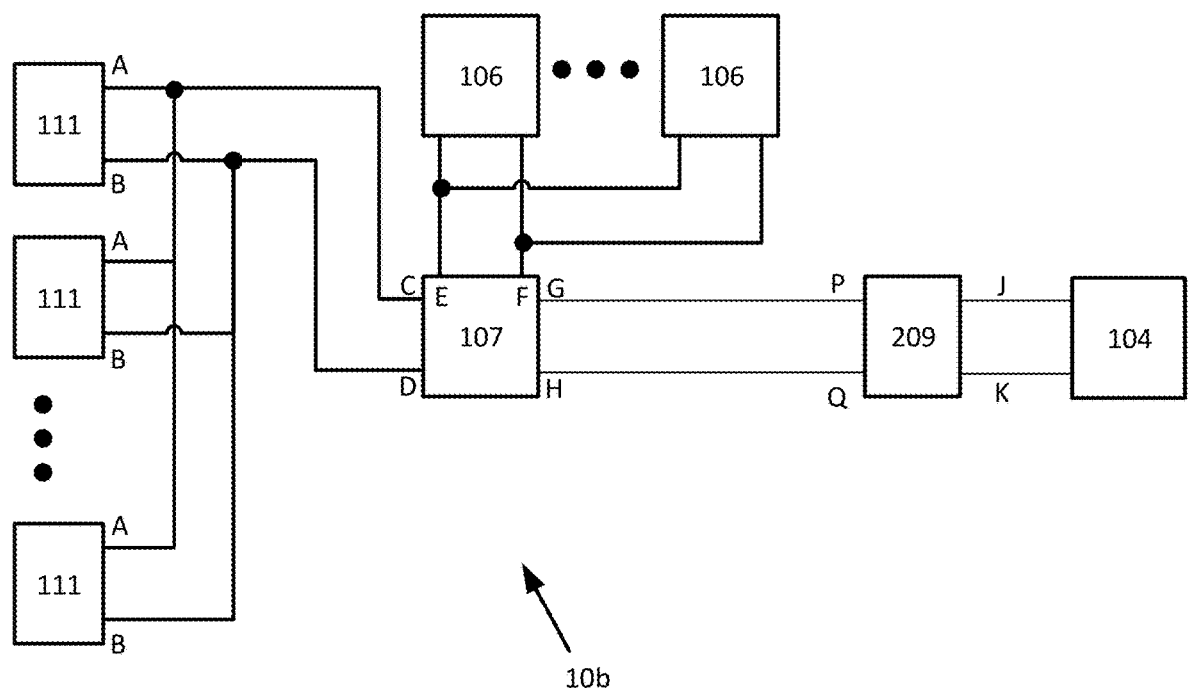

Reference is now made to FIG. 1B, which illustrates a block diagram of a power system 10b, according to at least one aspect. Power system 10b may be similar to power system 10a except with respect to wiring configurations 111. In power system 10b, each wiring configuration 111 may include output terminals A and B, whereby the outputs on terminals A and B of the wiring configurations 111 may be connected in parallel to form a parallel connection of wiring configuration 111 outputs that may be connected to input terminals C and D of link unit 107.

A feature of link units 107 according to certain aspects may be to include a power device that may convert power bi-directionally. A first direction of power conversion by a power device (such as power device 103 described in descriptions that follow) may be when multiple storage devices 106 are sourced with converted power from the power devices. Storage devices 106 may receive converted power from the power devices when storage devices 106 are being charged, for example. A second direction of power conversion may be when power from storage devices 106 is converted by the power device to be supplied to loads 104 via system power device 209.

Figure 2A:
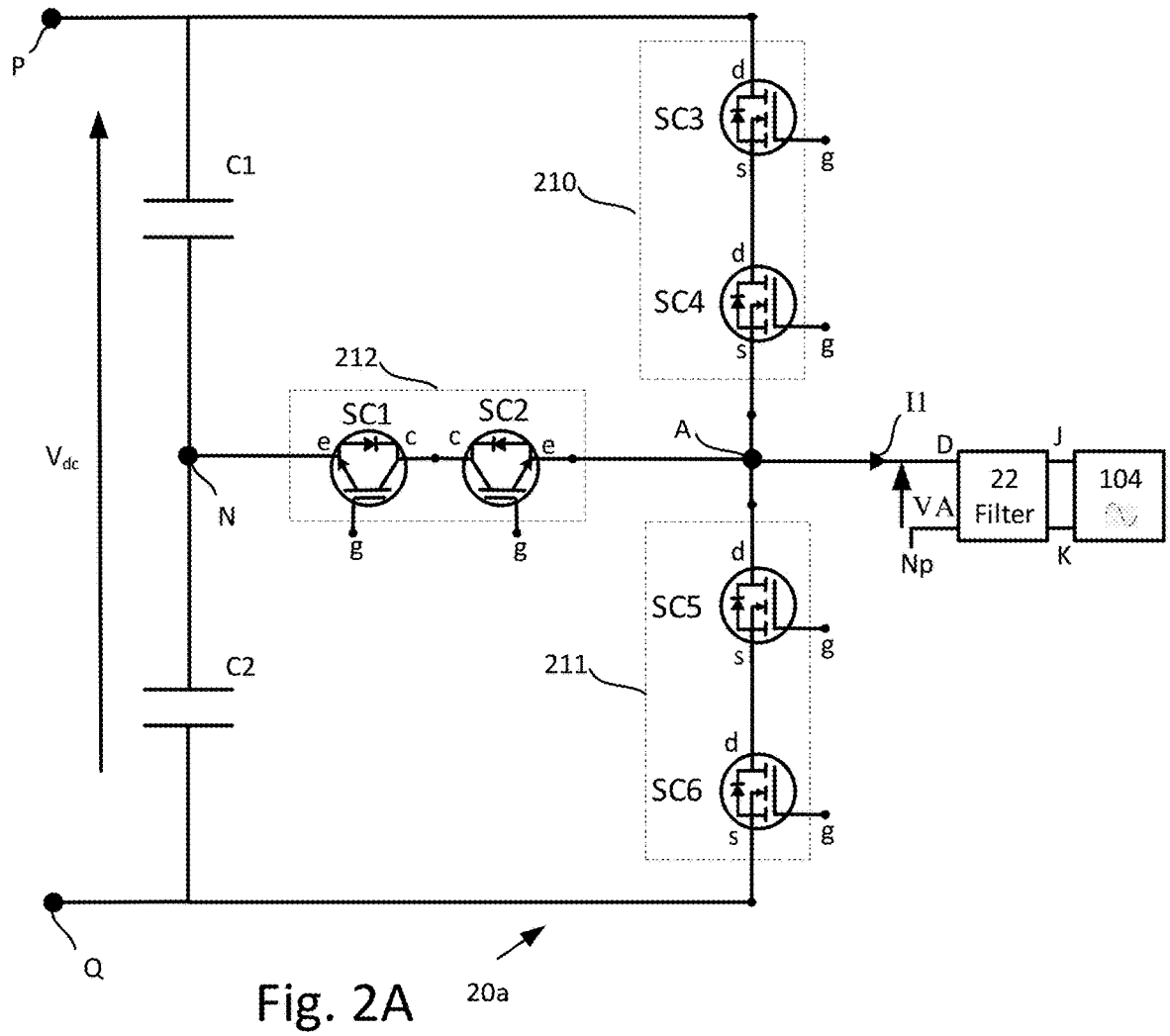
FIG. 2A shows an inverter implementation, according to at least one aspect.

Reference is now made to FIG. 2A, which shows an inverter 20a according to at least one aspect. Inverter 20a may be used as system power device 209 of FIG. 1A or 1B when system power device 209 may be or include an inverter. Any of switches SC1-SC6 may be implemented by various solid-state switches (e.g., metal oxide semiconductor field effect transistors (MOSFETs), insulated gate bipolar transistors (IGBT), bipolar junction transistors (BJTs), Silicon-Carbide switches (SiCs), Gallium Nitride (GaN) switches, super-junction transistors, etc.).

Switches SC1 and SC2 may be serially connected, forming a first switch leg 212. Switches SC3 and SC4 may be serially connected, forming a second switch leg 210. Switches SC5 and SC6 may be serially connected, forming a third switch leg 211. In a leg having two or more serially-connected switches, the leg may be 'OFF' if at least one of the serially-connected switches is 'OFF' without conduction through the switch and through a body diode. In a leg having two or more serially-connected switches, the leg may be 'ON if all of the serially-connected switches are 'ON', with conduction through the switch and/or through a body diode.

Inverter 20a may have an input at terminals P and Q that may receive a DC voltage Vac from a source of DC power or from terminals G and H of switch unit 107. The source of DC power (e.g., terminals G and H of switch unit 107) may be a floating input voltage ($V_{dc}$), or either of terminals G and H may be connected to a ground. In the descriptions that follow, nodes N and Np may be may be considered to be connected to a neutral connection point that in electrical systems may be connected to earth or ground. As such, the connection to the neutral connection point in the description of inverters 20 that follow may provide a bipolar output with a peak AC voltage output at node A alternating between substantially plus $V_{dc}$ divided by two ($V_{dc}/2$) and substantially minus $V_{dc}$ divided by two ($-V_{dc}/2$). Where nodes N and Np might be not connected to the neutral connection point (e.g., where node Q might not be connected to a reference and/or ground point), the output at Node A may alternate for example between substantially plus $V_{dc}$ and substantially zero. In such a case, the midpoint voltage may be substantially plus $V_{dc}$ divided by two ($V_{dc}/2$), and the output of inverter 20 may be considered to be unipolar.

A series connection of capacitors C1 and C2 may connect across terminals P and Q. Node N may be the middle connection point between capacitors C1 and C2. According to aspects of the disclosure, capacitors C1 and C2 may be replaced by other elements having substantially direct current (DC) voltage. Node N may connect to the emitter (e) of switch SC1. In a bipolar arrangement, node N may connect to the input terminal (Np) of filter 22 that is connected to ground or earth, and in a unipolar arrangement, input terminal Np may connect to terminal Q with input terminal Np not connected to ground or earth. Switches SC1 and SC2 are illustrated as insulated gate bipolar transistors (IGBTs), and switches SC3, SC4, SC5 and SC6 are shown as n-channel metal oxide semiconductor field effect transistors (MOSFETs). Switches SC1, SC2, SC3, SC4, SC5 and SC6 may also be implemented using p-channel MOSFETs or a different switch type. Collector (c) of switch SC1 may connect to the collector (c) of switch SC2. The emitter (e) of switch SC2 may connect to node A that may be connected to input terminal D of filter 22. The output of filter 22 on terminals J and K may connect to the input of load 104. Load 104, as mentioned previously, may be a utility grid, for example.

The drain (d) of switch SC3 may connect to terminal P and the source (s) of switch SC3 may connect to the drain (d) of switch SC4. The source of switch SC4 may connect to node A and to the drain (d) of switch SC5. The source of switch SC5 may connect to the drain (d) of switch SC6. The source of switch SC6 may connect to node Q.

Figures 2B, 2C, 2D:
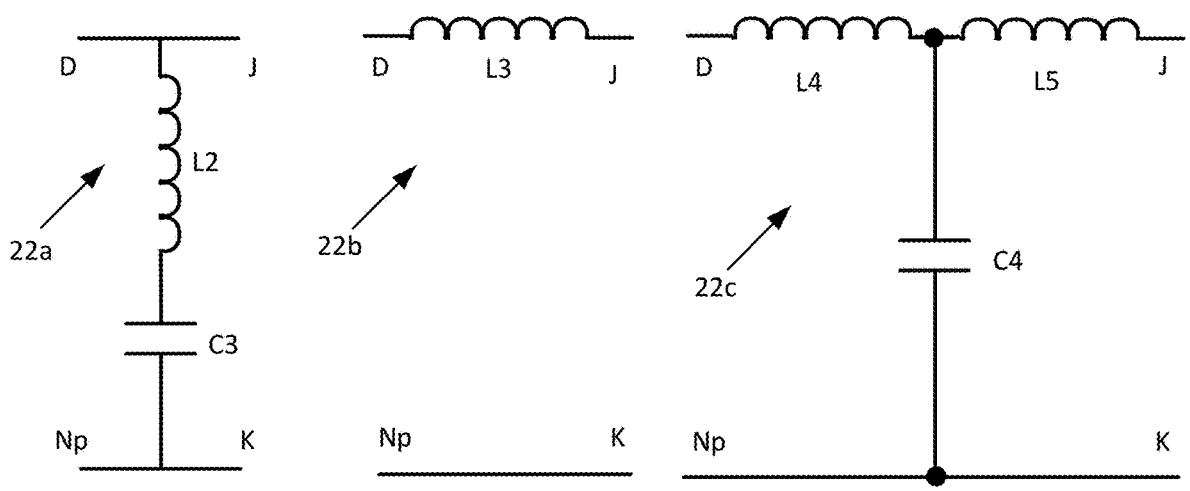
FIGS. 2B, 2C and 2D show further details of implementations of a filter shown in FIG. 2A, according to at least one aspect.

Reference is now made to FIGS. 2B, 2C and 2D, which show respective further details of filter 22a, LPF 22b and LPF 22c that may be implementations or partial implementations of filter 22, according to at least one aspect. Filter 22 is shown in FIG. 2A as a two-port network with an input terminals D and Np and output terminals J and K. Alternatively filter 22 may be implemented as multiple port networks. Similarly, filters 22a, 22b and 22c may have input terminals D and Np and output terminals J and K and may also be implemented as multiple port networks.

Filter 22a is shown as a series connection of inductor L2 and capacitor C3 that is connected between input terminal D/ output terminal J and input terminal Np/ output terminal K.

LPF 22b is shown as inductor L3 connected between input terminal D and output terminal J. Also, LPF 22b is shown having a through connection that connects input terminal Np to output terminal K.

LPF 22c is shown as inductor L4 connected in series with inductor L5 between input terminal D and output terminal J. One end of capacitor C4 connects at the point between the series connection of inductors L4 and L5. The other end of capacitor C4 connects to the through connection that connects input terminal Np to output terminal K. According to a variation of LPF 22c, inductor L5 might not be included, and terminal J may be connected directly to inductor L4 and capacitor C4.

In general, the filters of FIGS. 2B, 2C and 2D may be cascaded and combined together to form other filter implementations for filter 22. For example, in an implementation of filter 22, LPF 22b may be cascaded before filter 22a such that node J of LPF 22b connects to node D of filter 22a. The implementation may further include an additional LPF 22b cascaded after filter 22a such that node D of LPF 22b connects to node J of filter 22a.

In the description that follows, the operation of inverter 20a is described with regard to the operation and function of switches SC1-SC6 where switches SC1 and SC2 may be configured to form a bidirectional switch, for example, by each of switches SC1 and SC2 featuring a diode (either integrated with the switch or connected in parallel to the switch), and connected the anodes of the two diodes or connecting the cathodes of the two diodes, as shown in FIG. 2A. In the description that follows with respect to FIG. 2A, switches SC3, SC4, SC5, and SC6 may be considered to perform the role of main switches. Switches SC3 and SC4 may form a first main leg, and switches SC5 and SC6 may form a second main leg. In yet further descriptions that follow, switches SC3, SC4, SC5, and SC6 may be described in terms of performing an auxiliary role to other main switches, according to at least one aspect.

The DC input voltage ($V_{dc}$) may be converted into an AC voltage of a certain frequency (e.g., 50 Hz or 60 Hz) by application of control signals applied to the gates (g) of switches SC1-SC6. The control signals may be provided by a controller configured to operate switches SC1-SC6. The controller may be, for example, a digital signal processor (DSP), application-specific integrated circuit (ASIC), microcontroller, analog control device, or other control devices. The topology of inverter 20a may provide three discrete voltage levels at the inverter output (node A) that may be applied to input terminals D and Np of filter 22. The three voltage levels, according to a bipolar input voltage arrangement (when terminal Np is substantially equal to the voltage at terminal N) may be substantially plus $V_{dc}$ divided by two ($V_{dc}/2$), substantially minus $V_{dc}$ divided by two ($-V_{dc}/2$) and substantially zero (0) volts. The three voltage levels may correspond to three operating Switch States of inverter 20a. Further details of the three Switch States are detailed below when voltage $V_{dc}$ may be considered a bipolar input voltage to inverter 20a.

Switch State 1

Switch State 1 corresponds to a substantially positive voltage $V_{dc}$ divided by two ($V_{dc}/2$) at node A, a flow of current from DC-link voltage ($V_{dc}$) may flow through switches SC3 and SB4 (switches SC3 and SC4 are ON' for a time period while switches SC1, SC2, SC5 and SC6 may be 'OFF' for the time period. Alternatively, if at least one of switches SC5 and SC6 is rated to block the full DC-link voltage, one of switch SC5 or switch SC6 may be 'ON', with a switching leg comprising switches SC5 and SC6 effectively 'OFF' by virtue of the other one of switches SC5 and SC6 being 'OFF'.

Switch State 2

In Switch State 2, node D is connected to node A via switches SC1 and SC2. Switches SC3, SC4, SC5 and SC6 may be 'OFF' and a first current flow from DC-link voltage ($V_{dc}$) through the body diode of switch SC1, through switch SC2 ('PWM' applied) to node A or a second current flow in the opposite direction of the first current through the body diode of switch SC2 and through switch SC1. According to variations where switches SC1 and SC2 may be MOSFETs, both switches SC1 and SC2 may be 'ON' and conduction via a body diode might not be utilized.

Switch State 3

In Switch State 3, corresponding to negative $V_{dc}$ divided by two ($-V_{dc}/2$) at node A, a current flow may be through switches SC5 and SC6 (switches SC5 and SC6 may be 'ON') for a time period while switches SC1, SC2, SC3 and SC4 are 'OFF' for the time period. Current may flows through switches SC5 and through switch SC6 that are from node D and through node N (neutral) which may be connected to terminal Np (neutral). Alternatively, if at least one of switches SC3 and SC4 is rated to block the full DC-link voltage, one of switch SC3 or switch SC4 may be 'ON' with a switching leg comprising switches SC3 and SC4 effectively 'OFF' by virtue of the other one of switches SC3 and SC4 being 'OFF'.

In operation of inverter 20a, Switch States 1 and 2 may be alternated at a high frequency (e.g., 5 kHz, 10 kHz, 16 kHz, 100 kHz, 200 kHz, 1 MHz or higher) during a first part of a switching cycle, and Switch States 2 and 3 may be alternated at a high frequency during a second part of a switching cycle. During the first part of the switching cycle, switching legs 210 and 212 may be operated in 'PWM' mode (i.e., each of switching legs 210 and 212 alternate between conducting and dynamically blocking the voltage across capacitor C1), and switching leg 211 may be operated in 'OFF' mode, i.e., statically blocking the combined voltage across capacitors C1 and C2. During the second part of the switching cycle, switching legs 211 and 212 may be operated in 'PWM' mode (i.e., each of switching legs 211 and 212 alternate between conducting and dynamically blocking the voltage across capacitor C2), and switching leg 210 may be operated in 'OFF' mode, i.e., statically blocking the combined voltage across capacitors C1 and C2. For example, for a first part of a switching cycle, it may be desirable to input to filter 22 a voltage alternating at high frequency between $V_{dc}/2$ and 0, and for a second part of a switching cycle, it may be desirable to input to filter 22 a voltage alternating at high frequency between $-V_{dc}/2$ and 0.

In summary, Table 1 below shows a possible switching table for switches SC1, SC2, SC3 SC4, SC5 and SC6.

TABLE 1

| Switch State | Node A Voltage Level | SC1 | SC2 | SC3 | SC4 | SC5 | SC6 |
|---|---|---|---|---|---|---|---|
| 1 | $+V_{dc}/2$ | 'OFF' | 'OFF' | ON | 'ON' | 'OFF'/'ON' | 'OFF' |
| 2 | 0 | 'ON' | ON' | 'OFF/'ON'' | 'OFF' | 'OFF' | 'OFF' |
| 3 | $-V_{dc}/2$ | 'OFF' | 'OFF' | 'OFF' | 'OFF' | 'ON' | 'ON' |

According to certain features and modes of one or more aspects, individual operation of serially-connected switches may be reversed. For example, in Switch State 1, if SC5 is 'OFF', then SC6 may be either 'OFF' or 'ON' while maintaining the switching leg including switches SC5 and SC6 in the 'OFF' state.

With respect to the distribution of heat as a result of switching switches SC1-SC6 during Switch States 1, 2 and 3 it may be possible to reverse or alternate the role of switches SC3 and SC4 in Switch State 1 and switches SC5 and SC6 in Switch State 3. For example, in Switch State 1, where current from DC-link voltage ($V_{dc}$) flows through switch SC3 ('PWM' applied) for a time period while switch SC4 stays substantially closed or 'ON' for the time period it may be possible that instead, current from DC-link voltage ($V_{dc}$) flows through switch SC4 ('PWM' applied) for a time period while switch SC3 stays substantially closed or 'ON' for the time period. Similarly, in Switch State 3 current flow may be through switch SC6 ('PWM' applied) for a time period while switch SC5 stays substantially closed or 'ON' for the time period. It may be desirable (e.g., to reduce wear on a particular switch) to alternate the roles—i.e., during a first low-frequency half cycle, switch SC3 may be operated in PWM mode and switch SC4 may 'ON' for the time period, and during the next, second, low-frequency half cycle, the roles may be reversed where SC4 is =operated in PWM mode and switch SC3 may be 'ON' for the time period In sum, the three Switch States may present the three discrete voltage levels ($+V_{dc}/2$, 0 v and $-V_{dc}/2$) provided at node A. The result of the filtering of the AC voltage at node A applied to the input of filter 22 appears on the output of filter 22 on terminals J and K. In effect, filter 22 may reduce the amplitudes of the high frequency components of the voltage at node A to achieve an AC voltage on terminals J and K, which is more like a sine wave similar to that provided on a utility grid, for example.

In an alternative arrangement, inverter 20a may be replaced by a DC/DC converter having ode Np connected to terminal Q. In this arrangement, the voltage output between terminals D and Np is a DC voltage, and load 104 may be a DC load (e.g., a battery or a different type of DC load). In this case, switching leg 212 may feature only a single switch (SC2), as bidirectional active switching of switching leg 212 might not be necessary.

Figure 2E:
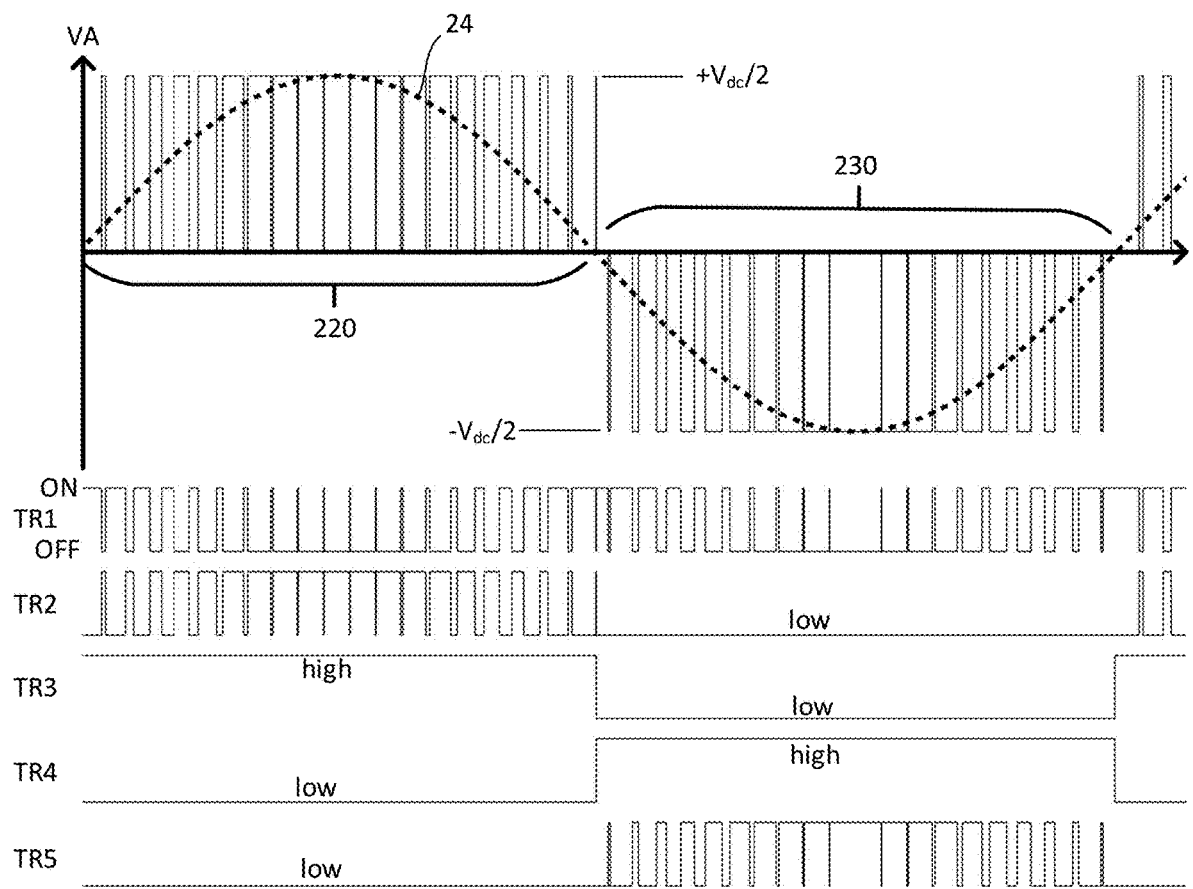
FIG. 2E shows waveforms of the operation of an inverter, according to at least one aspect.

Reference is now made to FIG. 2E, which shows waveforms associated with an operating inverter 20a, according to at least one aspect. Power inverters may be utilized to produce alternating current (AC) waveforms from direct current (DC) sources such as wiring configurations 111 or different interconnections of wiring configurations 111 and/or storage devices 106 as described above with respect to FIGS. 1A and 1B. The AC waveforms are derived by filtering voltages produced at node A with the use of filter 22. Filtering voltages produced at node A may be required as a result of the effects of the application of control signals to the gates (g) of switches SC1-SC6 during operation of switches SC1-SC6 in each of the three Switch States described above and summarized in Table 1 above. Inverter 20a may be controlled by control signals responsive to a reference waveform as shown in FIG. 2E as reference waveform 24, which is a sine wave drawn with dotted line. The reference waveform may also be triangular waveform, for example. Alternatively, frequency modulation may be used or a control signal that includes a variable pulse width and frequency. Reference waveform 24 may therefore also represent the desired AC sine wave output on terminals J and K in terms of desired frequency and peak to peak amplitude of substantially Vac. Voltage at node A is generated by operating switches SC1-SC6 to track waveform 24 in FIG. 2E. The control signals to control inverter 20a are shown as TR1, TR2, TR3, TR4 and TR5, which correspond respectively to the control signals applied to the gates of switches SC1/SC2, SC3, SC4, SC5 and SC6. The control signals applied to the gates of switches SC1/SC2, SC3, SC4, SC5 and SC6 are examples of pulse width modulation applied to the gates of switches SC1/SC2, SC3, SC4, SC5 and SC6 to track waveform 24.

An example of control signals applied to gates (g) of inverter 20a may be the application of pulse width modulation (PWM) signals responsive to the reference AC waveform 24 with respect to filter 22 connected to a utility grid or an independent grid to achieve: desired voltage and current amplitudes, frequency, phase balancing, frequency-based power reduction, reactive power control, inverter reconnection conditions, levels of total harmonic distortion, power factor and output power control required by the utility grid and/or the independent grid. Other international standards for grid converters may also need to be considered and may include, for example consideration of; German Low Voltage Grid Code VDE-AR-N-4105 (LVGC), IEEE 929-2000: Recommended Practice for Utility Interface of Photovoltaic (PV) Systems, IEC 61727; "Characteristics of the utility interface for photovoltaic (PV) systems"; International Electrotechnical Commission, IEC 61727, 2002 and EN61000-3-2-A standard for current harmonics.

Operation of Inverter 20a

Inverter 20a may be a neutral-point clamped (NPC) inverter. In normal operation, commutation paths may include an outer commutation path of a first leg comprising switches SC3 and SC4 and an inner commutation path of a bidirectional switch comprised of switches SC1 and SC2. The commutation paths may further include an outer commutation path of switches SC5 and SC6. The bidirectional switch may allow the flow of current in two directions opposite to each other according to modes described in further detail below. The bidirectional nature of the bidirectional switch may be by the use of either SC2 and the body diode of switch SC1 or switch SC1 and the body diode of switch SC2 in order to enable the flow of current in two directions opposite to each other.

Control signal TR1 may be applied to leg 210. When signal TR1 is illustrated as 'high', leg 210 is 'ON' by virtue of either of switch SC1 being on and the body diode of switch SC2 being conductive or by switch SC2 being on and the body diode of switch SC1 being conductive. Control signal TR2 may be applied to switch SC3, where when signal TR2 is 'high', switch SC3 is 'ON', and when TR2 is 'low', switch SC4 is 'OFF'. During time period 220, TR2 can be observed to switch between 'high' and 'low' at high frequency, indicating that switch SC3 is being operated in a 'PWM' switch state. Similarly, during time period 230, switch TR2 can be observed to be only 'low', indicating that switch SC3 is being operated in an 'OFF' switch state. Similarly, control signals TR3-TR5 may be applied to switches SC4-SC6, respectively.

Mode 1

In operating mode 1 (e.g., during time period 220 as illustrated in FIG. 2E), the output voltage VA varies at high frequency between 0V and $V_{dc}/2$, current I1 is positive, and current I1 flows towards to node D. The commutation goes back and forth between leg 210 having switches SC3/SC4 and leg 212 having the bidirectional switch using switch SC2 and the body diode of switch SC1. In operating mode 1, current flows alternately through leg 210 and through leg 212. Legs 210 and 212 may each be operated in switch state 'PWM'—when leg 210 is ON, leg 212 is OFF (statically blocking the full voltage of at least $V_{dc}$), and vice-versa. When leg 210 is ON, both switches SC3 and SC4 are in switch 'ON', and both switches SC1 and SC2 may be in switch state 'OFF'. When leg 212 is OFF in operating mode 1, a first switch (e.g., SC4) of switches SC3 and SC4 may be in switch state 'ON', and the second switch (e.g., SC3) may be in switch state 'OFF', dynamically blocking a voltage of up to at least $V_{dc}/2$. Switches SC3 and SC4 may each be rated to withstand a voltage of at least $V_{dc}/2$, and switches SC3 and SC4 collectively may withstand a voltage of $V_{dc}$ applied between terminals P and Q. Current I1 alternatively flows from node P via switches SC3 ('PWM' applied)/SC4 ('ON') to node D, and when one of switches SC3/SC4 are 'OFF', the current commutates to the inner switches SC2 and body diode of switch SC1 (Switch state 2) such that current I1 now flows from node N via SC2 ('PWM' applied) and body diode of switch SC1 to node D. As soon as switches SC3/SC4 are placed in Switch state 1, the body diode of switch SC1 may block voltage VA and so avoids a short circuit of the upper half of the DC-link voltage ($V_{dc}$) across nodes P and N/capacitor C1. In operating mode 1, both switches SC5 and SC6 may be OFF, and switches SC5 and SC6 may each be rated to withstand a voltage of at least $V_{dc}/2$, such that when both switches SC5 and SC6 are OFF, leg 211 may withstand a voltage of at least Vac.

Mode 2

In operating mode 2 (as illustrated in time period 230), the output current I1 is still positive while voltage VA alternates between 0V and $-V_{dc}/2$. Current I1 commutates back and forth between leg 212 and leg 211. Switches SC3 and SC4 may both be OFF. In operating mode 2, current flows alternately through leg 211 and through leg 212. Legs 211 and 212 may each be operated in switch state 'PWM'— when leg 211 is ON, leg 212 is OFF, and vice-versa. When leg 211 is ON, both switches SC5 and SC6 are in switch state 'ON', and both switches SC1 and SC2 may be in switch state 'OFF'. When leg 212 is OFF in operating mode 2, a first switch (e.g. SC5) of switches SC5 and SC6 may be in switch state 'ON', and the second switch (e.g. SC6) may be in switch state 'OFF'. Control signal TR5 may be observed to alternate at high frequency between 'high' and 'low', indicating the switch SC6 is being operating in switch state 'PWM'. In operating mode 2, both switches SC3 and SC4 may be OFF, and switches SC3 and SC4 may each be rated to withstand a voltage of at least $V_{dc}/2$, such that when both switches SC3 and SC4 are OFF, leg 210 may withstand a voltage of at least $V_{dc}$.

Mode 3

In operating mode 3, current I1 commutates back and forth between leg 211 and leg 212 via switch SC1 ('ON') and the body diode of switch SC2. Current I1 flows from node A to the DC-link voltage ($V_{dc}$) at node Q, switches SC5 (PWM' applied)/SC6 ('ON'), current I1 may be negative and voltage VA alternates between 0V and $-V_{dc}/2$. With switches SC5 ('PWM' applied)/SC6 ('ON') (switch state 3) switching, the body diode of switch SC2 blocks voltage VA and avoids shorting the negative half of the DC-link voltage ($V_{dc}$) across nodes N and Q/capacitor C2.

Mode 4

In operating mode 4, current I1 is negative while voltage VA may alternate between 0V and $V_{dc}/2$. Current I1 may commutate back and forth between leg 212 (via switch SC1/body diode of switch SC2) and leg 210 (via the body diodes of switches SC3/SC4 ('OFF'), or by turning switch SC3 and/or SC4 ON.

Still referring to FIG. 2E, control signals TR3 and TR4 may be observed to be either continuously 'high' for a period of time (e.g. 220 or 230) or continuously 'low for a period of time, indicating that switches SC4 and SC5 are switched at low frequency (e.g., 50 Hz or 60 Hz) compared to switches SC3 and SC6 (controlled by control signals TR2 and TR5. The illustration of FIG. 2E is illustrative only— while control signals TR5 and TR2 are illustrated as switching about 20 times as fast as control signals TR3 and TR4. In practice, control signals TR5 and TR2 may switch 100, 1000 or even 20,000 times faster than control signals TR3 and TR4.

According to at least one aspect, two serially-connected switches may have reversed roles at different time periods. For example, during a first time period 220 switch SC3 may be ON and switch SC4 may be operated in PWM mode (alternately conducting and dynamically blocking a voltage of at least $V_{dc}/2$), and during a second time period 220 (e.g., 20 milliseconds later, corresponding to a frequency of 50 Hz), switch SC4 may be ON and switch SC3 may be operated in PWM mode. In this manner, heat caused by high-frequency switching may be generated at different locations on a circuit board, and overall heat dissipation may be improved.

According to at least one aspect, one of the switches in leg 210 may be an IGBT (and not a MOSFET, as illustrated) and one of the switches in leg 211 may be an IGBT (and not a MOSFET, as illustrated). An IGBT may provide lower conduction losses when compared to a MOSFET, but may suffer from inferior switching characteristics (e.g., higher switching losses). By implementing switches SC4 and SC5 using IGBTs switched at a low frequency (as shown by control signals TR3 and TR4 in FIG. 2E), reduced conduction losses at legs 210 and 211 may be obtained.

Operating switches SC3-SC6 in the manner illustrated in FIG. 2E may provide certain benefits. For example, switching losses (and heat generated) may be substantially reduced compared to an operation wherein all four switches are switched at a high frequency. As another potential benefit, each switch of switches SC3-SC6 may be rated to withstand a reduced voltage of only $V_{dc}/2$.

Figure 2F:
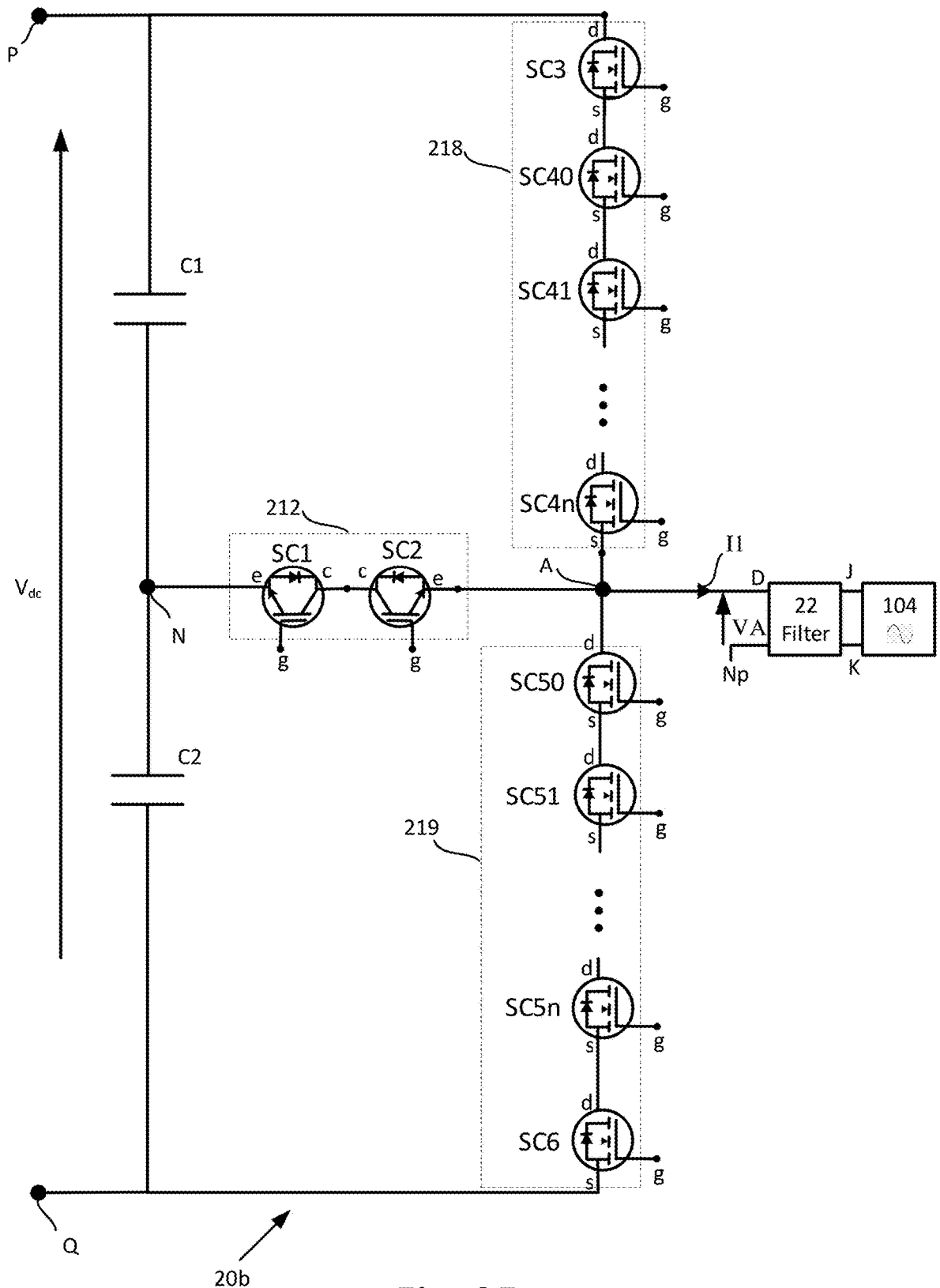
FIG. 2F shows an inverter implementation, according to at least one aspect.

Reference is now made to FIG. 2F, which illustrates an inverter 20b according to at least one aspect. Inverter 20b is similar to inverter 20a, with switching leg 218 replacing leg 210 of FIG. 2A and switching leg 219 replacing leg 211 of FIG. 2A. Switching leg 218 may comprise switch SC3 and switches SC40 . . . SC4n. Switch SC3 may be operated similarly to as described with regard to FIGS. 2A and 2E. Control signal TR2 of FIG. 2E may be applied to switch SC3. Switches SC40 . . . SC4n may collectively replace switch SC4 of FIG. 2A. Similarly, switch SC6 may be operated similarly to as described with regard to FIGS. 2A and 2E. Control signal TR5 of FIG. 2E may be applied to switch SC5. Switches SC50 . . . S54n may collectively replace switch SC5 of FIG. 2A.

Switches SC3 and SC6 may be rated to withstand a voltage of at least $V_{dc}/2$. Switches SC40 . . . SC4n may each be rated to withstand a voltage of at least $V_{dc}/2n$, where n is the number of switches in the group SC40 . . . SC4n. Control signal Tr3 of FIG. 2E may be applied to switches SC40 . . . SC4n. Similarly, Switches SC50 . . . SC5n may each be rated to withstand a voltage of at least $V_{dc}/2n$, where n is the number of switches in the group SC50 . . . SC5n, and control signal Tr4 of FIG. 2E may be applied to switches SC50 . . . SC5n.

Replacing switch SC4 with switches SC40 . . . SC4n may provide certain advantages. For example, where switch SC4 is implemented in FIG. 2A using a MOSFET rated to withstand 900V and having a conductance resistance of 100 mΩ, switches SC40 . . . SC4n may be six switches (e.g., MOSFETs), each rated to withstand about 150V and having a conductance resistance ($R_{ds,on}$) of about 3 mΩ, resulting in a total conductance resistance of about 20 mΩ (that may substantially reduce conductance losses across switches SC40 . . . SC4n). When replacing a single switch with a plurality of serially-connected switches, a lower total conductance resistance may be obtained (due to a nonlinear relationship between voltage rating and $R_{ds,on}$), but in some arrangements, care must be taken (and cost may be increased) to ensure synchronized switching of the plurality of serially-connected switches, to avoid a scenario where a single switch is left in the OFF state, blocking a voltage which is greater than the voltage rating of the single switch. In the arrangement of FIG. 2F, switches SC40 . . . SC4n may be switched when switch SC3 is OFF and/or when leg 212 is ON, reducing the risk of an overvoltage across switches SC40 . . . SC4n. Similarly, switches SC50 . . . SC5n may be switched when switch SC6 is OFF and/or when leg 212 is ON, reducing the risk of an overvoltage across switches SC50 . . . SC5n.

As another numerical example, switches SC40 . . . SC4n may be ninety switches, each rated to withstand 10V, and collectively rated to withstand 900V. Switches SC40 . . . SC4n might not be identical; any combination of voltage ratings summing to the desired total voltage rating may be used, which may provide great flexibility in design and potential cost reduction.

Figure 3A:
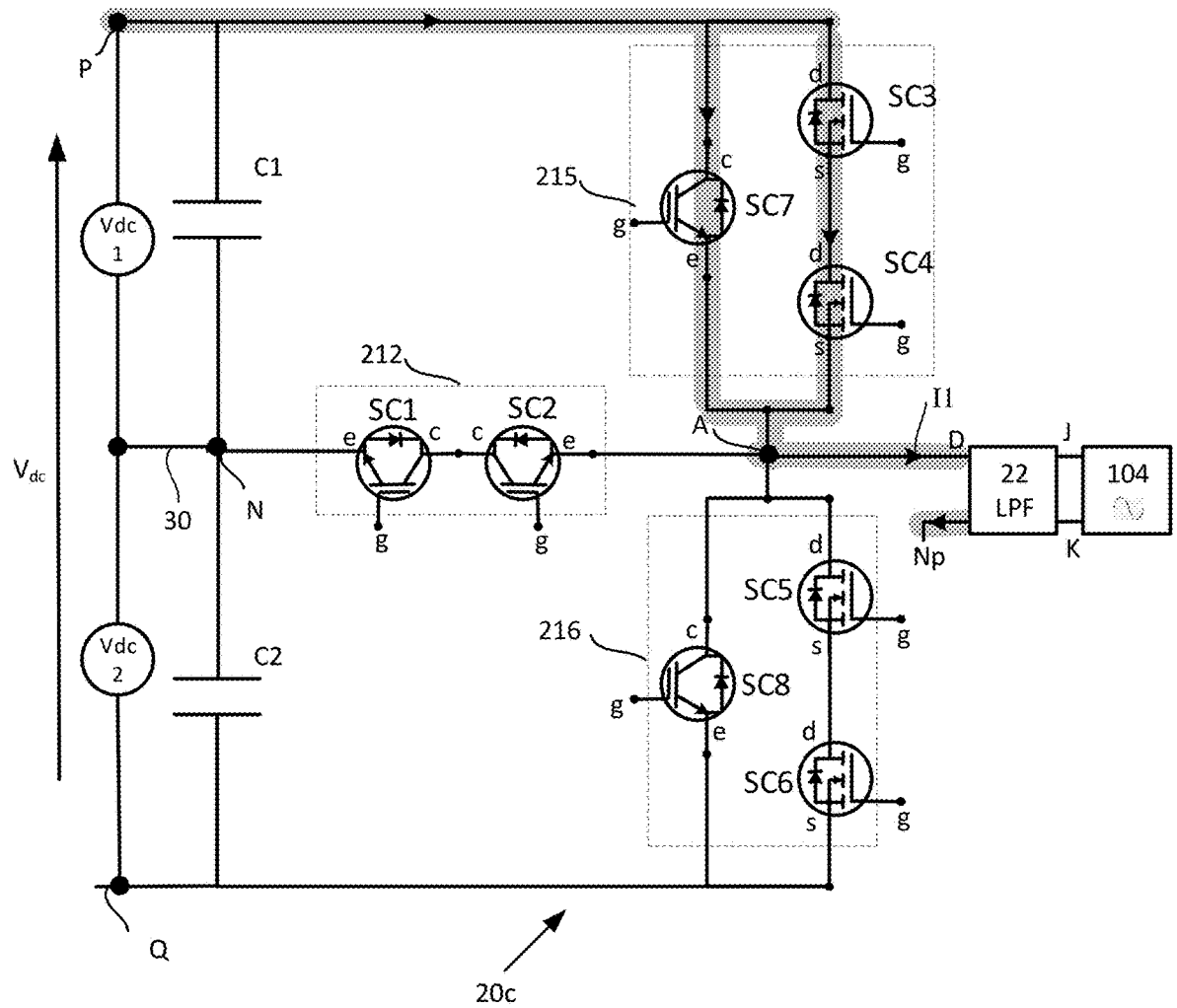
FIGS. 3A, 3B, 3C are drawings of an inverter indicating paths of current flow, according to at least one aspect.
Figure 3B:
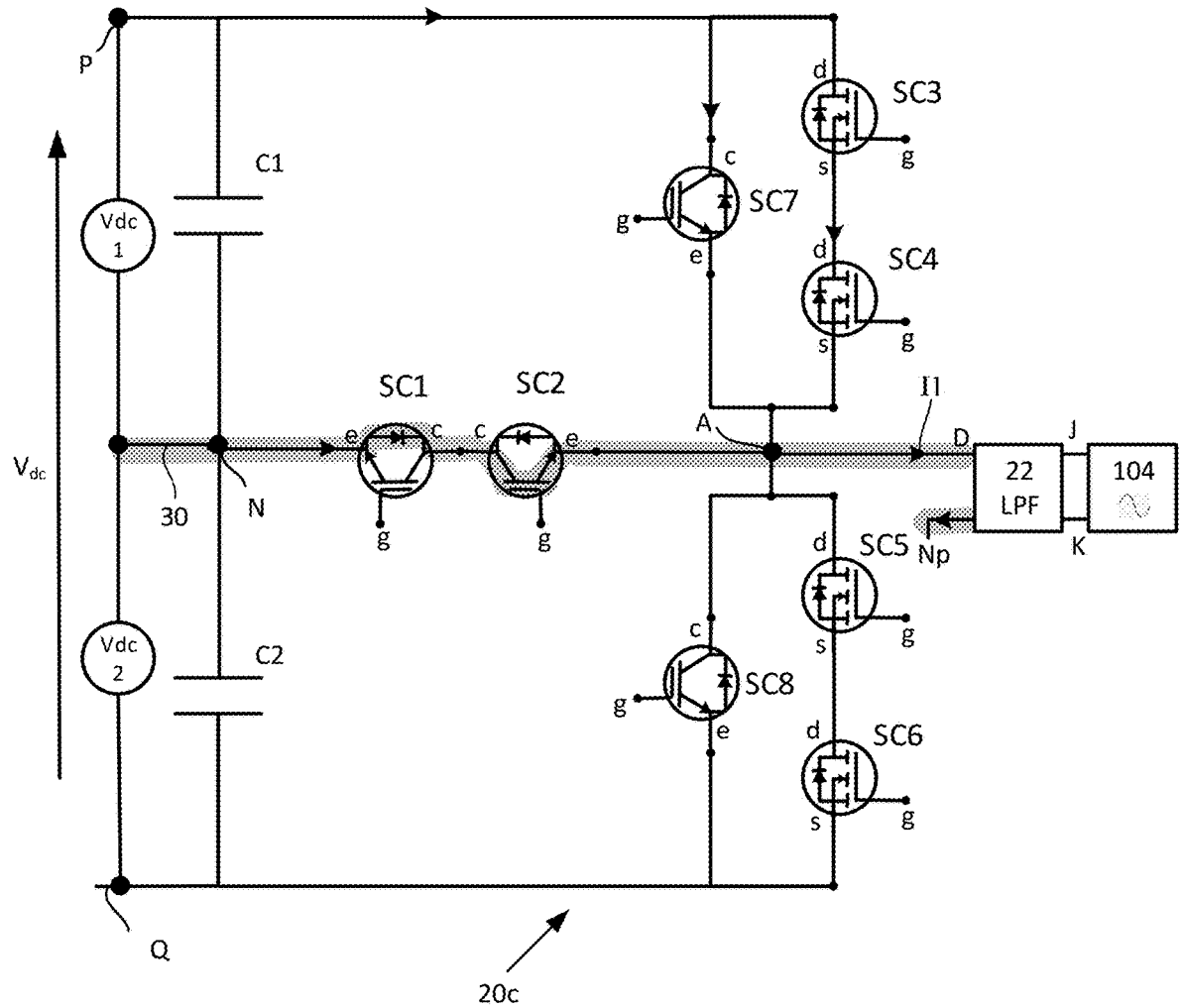
Figure 3C:
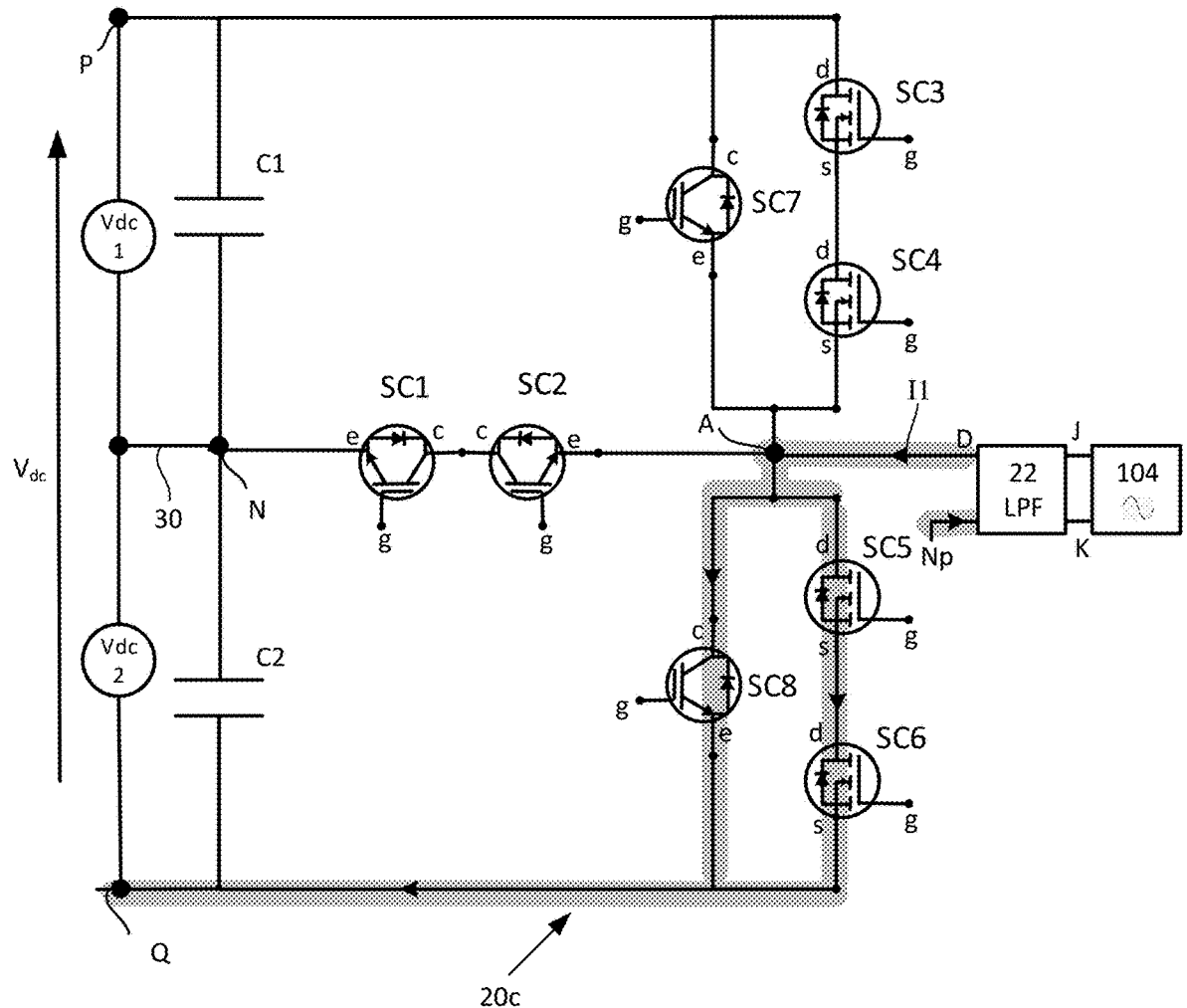

Reference is now made to FIGS. 3A, 3B and 3C, which show an inverter 20c, according to at least one aspect. Inverter 20c is the same as inverter 20a except with respect to the connection of voltage $V_{dc}$ across terminals P and Q and use of main switches SC7 and SC8 with auxiliary switches SC3, SC4 and SC5, SC6. The connection of voltage $V_{dc}$ is a series connection of DC voltage sources $V_{dc1}$ and $V_{dc2}$, where the connection between voltage sources $V_{dc1}$ and $V_{dc2}$ is connected to node N by link 30. Alternatively link 30 may be removed and $V_{dc}$ applied to terminals P and Q according to the description above with respect to FIG. 2A. An example of the connection between voltage sources $V_{dc1}$ and $V_{dc2}$ connected to node N may be when voltage sources $V_{dc1}$ and $V_{dc2}$ are provided from a series connection of photovoltaic panels that provide respective voltages $V_{dc1}$ and $V_{dc2}$.

Switches SC3-SC6 may be MOSFETs, as illustrated, and switches SC7 and SC8 may be different types of switches such as an IGBT, SiC or GaN switch.

FIGS. 3A, 3B and 3C correspond to the three Switch States of operation of inverter 20c to provide a three-level output at node A corresponding to $V_{dc}/2$, 0 v and $-V_{dc}/2$. Inverter 20c may be used as system power device 209 when system power device 209 may be or include an inverter. According to one or more aspects described herein, the role of switches SC3, SC4 and switches SC5, SC6 may be in an auxiliary role and may be respectively used to mitigate conduction losses of main switches SC7 and SC8. As such switches SC3, SC4 and switches SC5, SC6 in the description that follows are referred to as auxiliary switches. Where main switches SC7 and SC8 may be implemented as IGBTs, a possible drawback to IGBTs may be their slower switching speed when compared with the switching speeds of MOSFETs for example. Mitigation of switching losses of main switches SC7 and SC8 may be such that on their own, main switches SC7 and SC8 are rated to block the full DC-link voltage Vdc, and may commutate at half the DC link voltage ($\pm V_{dc}/2$) when operated in 'PWM' mode. The use of auxiliary switches SC3, SC4, SC5, and SC6 may be utilized to compensate for possible conduction losses of main switches SC7 and SC8 as well as to compensate for possible increased switching losses of main switches SC7 and SC8 due to increased demand for higher DC link voltages ($V_{dc}$).

Main switch SC7 may be switched substantially in tandem with one of switches SC3 and SC4. For example, where SC3 is PWM-switched for time period 220 of FIG. 2E, main switch SC7 may be switched substantially at the same time as switch SC4. As will be discussed in greater detail below (see FIG. 4), a slight delay may be inserted when switching SC3 and SC7 in tandem, to provide zero-voltage switching conditions for switch SC7. Such a slight delay may correspond to a value between 1 µsec and 10 µsec in some aspects.

Reference is now made again to FIGS. 3A, 3B, 3C and to FIG. 2E, according to one or more aspects. FIGS. 3A, 3B, 3C include marked areas in grey lines to indicate the commutation paths. The commutation paths may include an outer commutation path through leg 215 having main switch SC7 and auxiliary switches SC3/SC4, and an inner commutation path through leg 212 having a bidirectional switch composed of switches SC1 and SC2. The commutation paths may further include an outer commutation path through leg 216 having main switch SC8 and auxiliary switches SC5/SC6. The bidirectional switch allows the flow of current in two directions opposite to each other according to modes described in further detail below. The bidirectional nature of the bidirectional switch may be by the use of either SC2 and the body diode of switch SC1 or switch SC1 and the body diode of switch SC2 in order to enable the flow of current in two directions opposite to each other.

Referring back to FIG. 2E, the control signals to control inverter 20c are shown as TR1, TR2, TR3, TR4 and TR5 that correspond respectively to the control signals applied to the gates of switches SC1/SC2, SC7/SC3, SC4, SC5 and SC6/SC8.

In descriptions that follow there might be no commutation between leg 215 and mains switch leg 216. As such, FIGS. 3A, 3B, 3C may similarly have similar control signals that correspond with the control signals applied to gates (g) of inverter 20a. The control signals may be the application of pulse width modulation (PWM) signals responsive to reference AC waveform 24 as shown in FIG. 2E. As such, with node A connected to the input of filter 22 and the output of filter 22 connected to a utility grid and/or load such as an AC motor for example, inverter 20c may be controlled to achieve: desired voltage and current amplitudes, frequency, phase balancing, frequency-based power reduction, reactive power control, inverter reconnection conditions, levels of total harmonic distortion, power factor and output power control required by the utility grid and/or load. Alternatively, frequency modulation may be used or a control signal that includes a variable pulse width and frequency.

Operation of Inverter 20c

In normal operation, the commutation paths may include a first outer commutation path through leg 215 having of main switch SC7/auxiliary switches SC3/SC4 and an inner commutation path through leg 212 having a bidirectional switch composed of switches SC1 and SC2. The commutation paths may further include a second outer commutation path through leg 216 having main switch SC8/auxiliary switches SC5/SC6 and through leg 212 having the bidirectional switch.

It may be noted that various connections are set forth between elements herein. These connections are described in general and, unless specified otherwise, may be direct or indirect; this specification may be not intended to be limiting in this respect. Further, elements of one aspect may be combined with elements from other aspects in appropriate combinations or sub-combinations.

In the examples described above with respect to FIG. 2A, switches SC3, SC4, SC5 and SC6 are used as main switches in inverter 20a. Where switching on of one of the switches (e.g., switch SC3) is by application of PWM to the one switch for a time period whilst the other switch (e.g., switch SC4) remains 'ON' during the time period. Since the two switches are connected in series and operated in Switch State 1 such that switch SC4 is 'ON' before switch SC3 is on and switch SC3 goes 'OFF' before switch SC4 is 'OFF', the voltage across switch SC3 ('PWM' applied) is halved so switching losses are reduced and a possible problem of trying to control both switches SC3 and SC4 both being on may also be eliminated. The benefits of lower switching losses and simplified control of the possible problem of trying to control both switches SC3 and SC4 both being 'ON' may then further be added to the additional features of inverter 20c.

Auxiliary switches SC3, SC4 and SC5, SC6 may be respectively connected in parallel to the main switches SC7 and SC8, which may help to move the switching losses away from main switches SC7 and SC8. The switching losses may move to the higher side of auxiliary switches SC3, SC5 while a substantial majority of current may still flow through main switches SC7 and SC8. In general, with respect to FIGS. 3A, 3B and 3C, two auxiliary switches may be connected in a series connection and the series connection connected across the main switch. Switching of the main switch may be by application of PWM to the main switch and one of the auxiliary switches for a time period with the other auxiliary switch remaining 'ON' during the time period. Alternatively, three auxiliary switches may be wired in series where switching of the main switch is by application of PWM to the main switch and one of the auxiliary switches for a time period with the other two auxiliary switches remaining 'ON' during the time period.

Figure 3D:
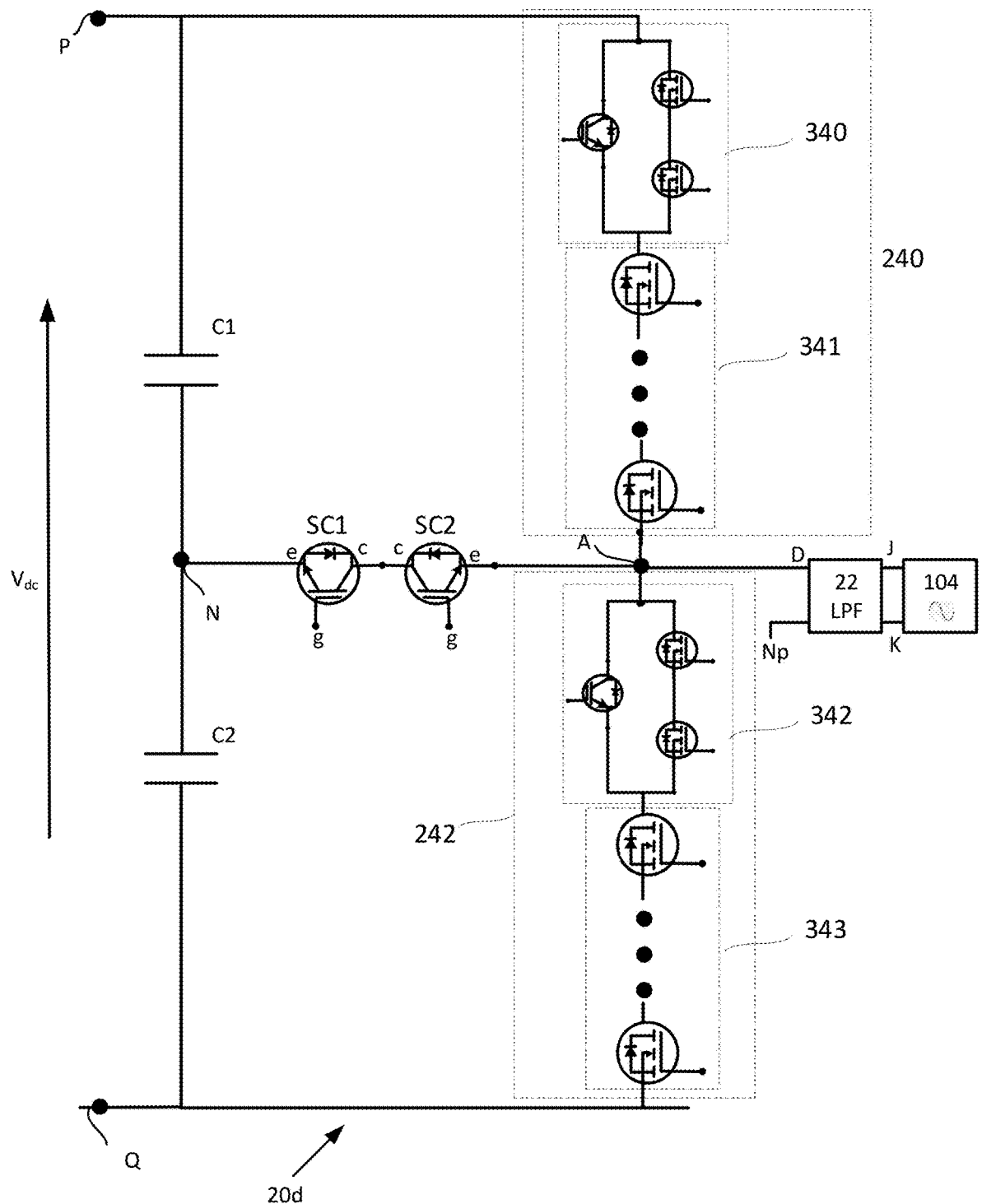
FIG. 3D illustrates a power converter, according to at least one aspect.

Reference is now made to FIG. 3D, which illustrates a power converter 20d according to aspects of the disclosure. Power converter 20d may feature a first switching leg 240 including hybrid switching circuit 241 connected in series to serial switching circuit 242. Hybrid switching circuit 241 may be arranged in a manner the same as or similar to switches SC3, SC4 and SC7 of FIG. 3A, and serial switching circuit 242 may include a series connection of switches (e.g., MOSFETs), similar to or the same as switches SC40 . . . SC4n of FIG. 2F. Power converter 20d may further feature a second switching leg 250 including hybrid switching circuit 251 connected in series to serial switching circuit 252. Hybrid switching circuit 251 may be arranged in a manner the same as or similar to switches SC5, SC6 and SC8 of FIG. 3A, and serial switching circuit 252 may include a series connection of switches (e.g., MOSFETs).

First switching leg 240 may alternate between an OFF mode of operation (e.g., where the switching leg 240 statically blocks the full input DC voltage for about half of a low-frequency time period, e.g., for about 10 ms of a 20 ms time period corresponding to a 50 Hz frequency) and a PWM mode of operation (where the switching leg alternates, at high frequency, between (i) dynamically blocking half of the input DC voltage and (ii) conducting). When in the OFF mode of operation, all of the switches in switching leg 240 may be OFF. When in the PWM mode of operation, serial switching circuit 242 may be ON, and hybrid switching circuit 241 may alternate (at high frequency) between ON and OFF (dynamically blocking about half of the input DC voltage). When in the PWM mode of operation, hybrid switching circuit 241 may utilize a first switch (e.g., an IGBT) as a main switch, and one or more additional switches (e.g. MOSFETs) as auxiliary switching for reducing conduction losses.

Second switching leg 250 may be constructed and operated in a similar but complementary manner to first switching leg 240.

Figure 4:
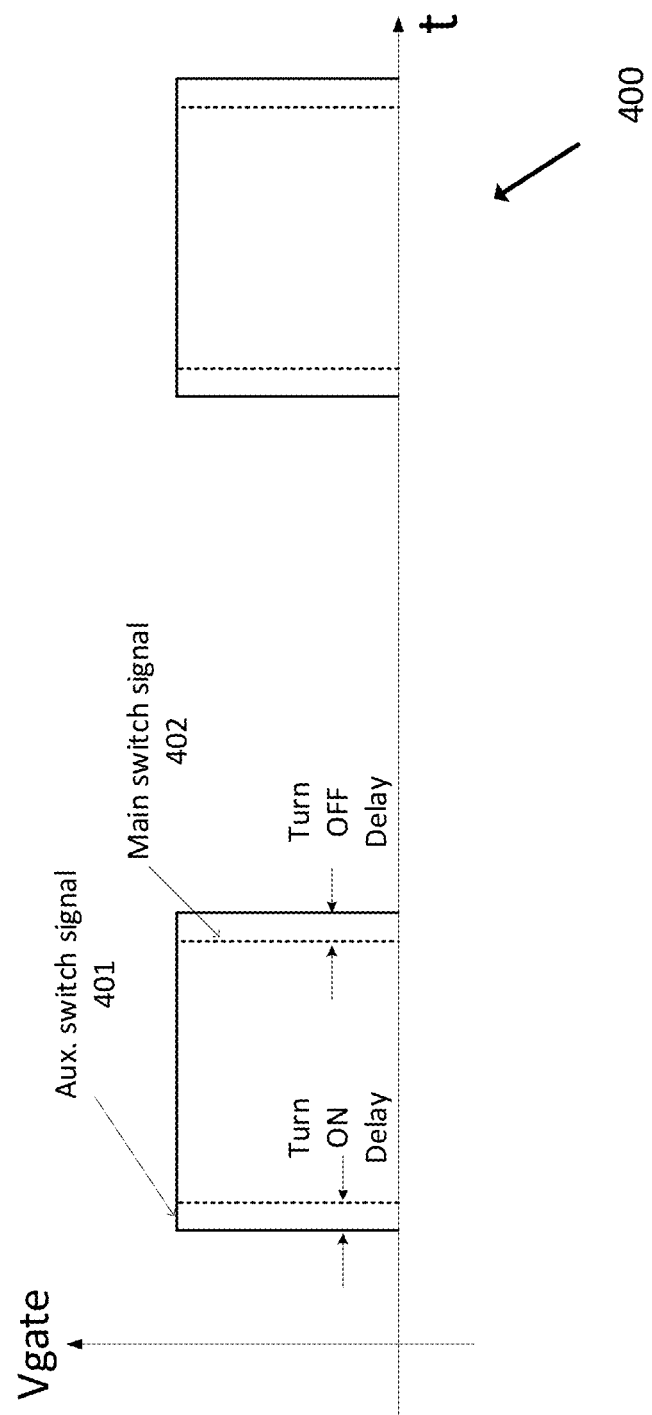
FIG. 4 shows a timing diagram for operating switches, according to at least one aspect.

Reference is now made to FIG. 4, which illustrates a timing diagram for operating a hybrid switch circuit, for example, leg 215 of FIG. 3A having switches SC3, SC4 and SC7, and/or hybrid switching circuits 241 and 251 of FIG. 3D. Timing diagram 400 shows gate voltage signals that may be applied to switches SC3, SC4 and SC7 of FIG. 3A. Timing diagram 400 shows an auxiliary switch gate signal 401 and a main switch gate signal 402. The main switch may be, for example, switch SC7 of FIG. 3A, and the auxiliary switch may be, for example, switch SC3 of FIG. 3A (where switch SC4 may be switched at a low frequency) or switch SC4 of FIG. 3A (where switch SC3 may be switched at a low frequency). The main and auxiliary switches may be operated as follows:

a. When switching from OFF to ON, the auxiliary switch (e.g., SC3) may be turned ON (and switch SC4 of FIG. 3A may be continuously ON), conducting current and reducing the voltage across the main switch.

b. After a suitably short delay (e.g., several microseconds or tens of microseconds), the main switch may be turned on and short out the auxiliary switch, providing a significantly lower conduction path for the main current. If the main switch has an intrinsically larger switching delay than the auxiliary switch, the controller operating the main and auxiliary switches might not insert any delay.

c. After the required ON TIME, the main switch may be turned off and the current may commutate back to the auxiliary switch.

d. Again after a suitable short delay, the auxiliary switch may be switched off and its drain-source voltage may rise.

A benefit of wiring two or three auxiliary switches in a series connection across a main switch and/or mains switches connected and operated in series compared to a single main switch and/or single auxiliary switch may be that operating (i.e., blocking) voltage demands for the auxiliary switches may be reduced respectively by a half or a third by virtue of the series connection. Reduced voltages may reduce conduction losses of the switches. Reduction in operating voltage may reduce manufacturing cost of inverters due to overall cost of implementing series connections of main switches and/or auxiliary switches for Switch States 1, 2 and 3 compared to one main switch and/or one auxiliary switch for Switch States 1, 2 and 3, for example.

Descriptions above have illustrated a single-phase inverter but the same use of switches may be applied to similar three phase inverter circuit implementations also. The same use of switches may be applied to other neutral point clamped inverter topologies for both three phase and single phase inverters. The same use of switches may also be similarly applied to multi-level inverters of various types.

What is claimed is:

1. An apparatus comprising:
a first switch leg connected between a first input terminal and a first output terminal, the first switch leg comprising a plurality of first serially connected switches;
a second switch leg connected between a second input terminal and the first output terminal, the second switch leg comprising a plurality of second serially connected switches;
a third switch leg connected between an input voltage midpoint and the first output terminal; and
a controller configured to:
disable the second switch leg during a first time period, and alternately enable the first switch leg and the third switch leg during the first time period, and
disable the first switch leg during a second time period, and alternately enable the second switch leg and the third switch leg during the second time period.

2. The apparatus of claim 1, wherein the plurality of first serially connected switches or the plurality of second serially connected switches each comprise a plurality of serially-connected metal oxide semiconductor field effect transistors (MOSFETs).

3. The apparatus of claim 1, wherein the first switch leg and the second switch leg each comprise at least one metal oxide semiconductor field effect transistor (MOSFET) and at least one insulated gate bipolar transistor (IGBT).

4. The apparatus of claim 2, wherein the third switch leg comprises a plurality of serially connected IGBTs.

5. The apparatus of claim 2, wherein the controller is further configured to operate a first MOSFET, of the plurality of serially-connected MOSFETs, in the first switch leg at a first frequency and to operate a second MOSFET, of the plurality of serially-connected MOSFETs, in the first switch leg at a second frequency lower than the first frequency.

6. The apparatus of claim 3, wherein the controller is further configured to operate at least one MOSFET of the first switch leg at a first frequency and to operate at least one IGBT of the first switch leg at a second frequency lower than the first frequency.

7. The apparatus of claim 1, wherein the first switch leg further comprises a parallel switch connected in parallel to at least one of the plurality of first serially connected switches.

8. The apparatus of claim 7, wherein the parallel switch is an IGBT, wherein the controller is further configured to:
disable the second switch leg during the first time period and alternately enable the first switch leg and the third switch leg during the first time period such that:
the plurality of first serially connected switches are ON when a plurality of third serially connected switches of the third switch leg are OFF during at least a first portion of the first time period, and
the plurality of first serially connected switches are OFF when the plurality of third serially connected switches are ON during at least a second portion of the first time period; and
disable the first switch leg during the second time period and alternately enable the second switch leg and the third switch leg during the second time period such that:
the plurality of second serially connected switches are ON when the plurality of third serially connected switches are OFF during at least a first portion of the second time period, and
the plurality of second serially connected switches are OFF when the plurality of third serially connected switches are ON during at least a second portion of the second time period.

9. The apparatus of claim 1, further comprising:
a first capacitor connected between the first input terminal and the input voltage midpoint, and
a second capacitor connected between the second input terminal and the input voltage midpoint,
wherein each of the first switching leg and the second switching leg is rated to statically block a total voltage across the first capacitor and the second capacitor.

10. The apparatus of claim 9, wherein the first switching leg is rated to dynamically block a voltage across the first capacitor, and
wherein the second switching leg is rated to dynamically block a voltage across the second capacitor.

11. The apparatus of claim 6, wherein the second frequency is a grid frequency.

12. A method comprising:
controlling, by a controller, a first switch leg, a second switch leg, and a third switch leg to track a periodic reference waveform, wherein each of the first switch leg, the second switch leg, and the third switch leg comprises a plurality of serially connected switches,
wherein the controlling comprises:
controlling the first switch leg and the third switch leg to be alternately enabled and disabled during a first half-period of the periodic reference waveform, and controlling the second switch leg to be disabled during the first half-period of the periodic reference waveform; and
controlling the second switch leg and the third switch leg to be alternately enabled and disabled during a second half-period of the periodic reference waveform, and controlling the third switch leg to be disabled during the second half-period of the periodic reference waveform.

13. The method of claim 12, wherein alternately enabling and disabling the first switch leg comprises controlling a first switch of the first switch leg to be ON and controlling a second switch of the first switch leg to be alternately ON and OFF.

14. The method of claim 12, wherein the controlling the second switch leg to be disabled during the first half-period comprises controlling the plurality of serially connected switches in the second switch leg to be OFF during the first half-period, and
wherein the controlling the third switch leg to be disabled during the second half-period comprises controlling the plurality of serially connected switches in the third switch leg to be OFF during the second half-period.

15. The method of claim 13, wherein the controlling the first switch leg to be alternately enabled and disabled comprises controlling a third switch of the first switch leg alternately ON and OFF, wherein the third switch is substantially controlled in tandem with the second switch, and wherein the third switch is connected in parallel to one of (i) a series connection of the first switch and the second switch, or (ii) the second switch.

16. A switching circuit for a converter, the switching circuit comprising:

a plurality of switches connected in series to form a switching leg;

a controller configured to cause the switching leg to alternate between:

an ON state, in which at least one of the plurality of switches comprising the switching leg is maintained in the ON state and at least one other switch of the plurality of switches comprising the switching leg is switched between the ON state and an OFF state during a first portion of each switching cycle of the switching circuit, and the OFF state, in which each of the plurality of switches comprising the switching leg is maintained in the OFF state during a second portion of each switching cycle of the switching circuit.

17. The switching circuit according to claim 16, wherein the plurality of switches comprise first and second switches each having a voltage rating of Vo volts such that the switching leg has a voltage rating of 2*Vo volts, wherein the controller is further configured to control the switching leg such that the first switch is switched between the ON state and the OFF state and the second switch is maintained in the ON state during the first portion of each switching cycle, and wherein the switching leg is configured to block no more than the voltage rating of Vo volts during the first portion of each switching cycle, so as to result in dynamic blocking of up to the voltage rating of Vo during the first portion of each switching cycle.

18. The switching circuit according to claim 17, wherein the controller is further configured to control the switching leg such that the first and second switches are switched to be in the OFF state during the second portion of each switching cycle, so as to result in statically blocking of up to the voltage rating of 2*Vo volts during the second portion of each switching cycle.

19. The switching circuit according to claim 16, wherein the switching leg comprises first, second and third switches each having a voltage rating of Vo volts such that the switching leg has a voltage rating of 3*Vo volts, wherein the first and second switches are each switched between the ON state and the OFF state, and the third switch is maintained in the ON state during the first portion of each switching cycle, and wherein the switching leg is configured to block no more than a voltage rating of 2*Vo volts during the first portion of each switching cycle, so as to result in statically blocking of up to the voltage rating of 2*Vo during the second portion of each switching cycle.

20. The switching circuit according to claim 19, wherein the controller is further configured to control the switching leg such that the first, second and third switches are switched to be in the OFF state during the second portion of each switching cycle, so as to result in statically blocking of up to the voltage rating of 3*Vo volts during the second portion of each switching cycle.

* * * * *